(12) United States Patent
Ramesh et al.

(10) Patent No.: US 12,462,457 B2
(45) Date of Patent: Nov. 4, 2025

(54) SYSTEMS AND METHODS FOR HIERARCHICAL TEXT-CONDITIONAL IMAGE GENERATION

(71) Applicant: OpenAI Opco, LLC, San Francisco, CA (US)

(72) Inventors: Aditya Ramesh, San Francisco, CA (US); Prafulla Dhariwal, San Francisco, CA (US); Alexander Nichol, San Francisco, CA (US); Casey Chu, San Francisco, CA (US); Mark Chen, Cupertino, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/419,675

(22) Filed: Jan. 23, 2024

(65) Prior Publication Data

US 2024/0331237 A1    Oct. 3, 2024

Related U.S. Application Data

(63) Continuation of application No. 18/193,427, filed on Mar. 30, 2023, now Pat. No. 11,922,550.

(51) Int. Cl.
*G06T 11/60* (2006.01)
*G06F 40/284* (2020.01)
(Continued)

(52) U.S. Cl.
CPC ............ *G06T 11/60* (2013.01); *G06F 40/284* (2020.01); *G06F 40/30* (2020.01); *G06N 3/045* (2023.01);
(Continued)

(58) Field of Classification Search
CPC ....... G06T 11/60; G06T 11/001; G06T 9/002; G06F 40/30; G06F 40/284; G06N 3/045; G06N 3/08
See application file for complete search history.

(56) References Cited

U.S. PATENT DOCUMENTS 11,544,880 B2    1/2023  Park et al.
2021/0073272 A1  3/2021  Garrett et al.
(Continued)

OTHER PUBLICATIONS

Federico A. Galatolo, et al., "Generating images from caption and vice versa via CLIP-Guided Generative Latent Space Search", arXiv:2102.01645, Proc. of the International Conf. on Image Processing and Vision Engineering, at https://arxiv.org/pdf/2102.01645.pdf, 2021 (Year: 2021).*

(Continued)

*Primary Examiner* — Jin Cheng Wang
(74) *Attorney, Agent, or Firm* — FINNEGAN, HENDERSON, FARABOW, GARRETT & DUNNER LLP

(57) ABSTRACT

Disclosed herein are methods, systems, and computer-readable media for generating an image corresponding to a text input. In an embodiment, operations may include accessing a text description and inputting the text description into a text encoder. The operations may include receiving, from the text encoder, a text embedding, and inputting at least one of the text description or the text embedding into a first sub-model configured to generate, based on at least one of the text description or the text embedding, a corresponding image embedding. The operations may include inputting at least one of the text description or the corresponding image embedding, generated by the first sub-model, into a second sub-model configured to generate, based on at least one of the text description or the corresponding image embedding, (Continued)

an output image. The operations may include making the output image, generated by the first second sub-model, accessible to a device.

20 Claims, 5 Drawing Sheets

(51) Int. Cl.
    *G06F 40/30*     (2020.01)
    *G06N 3/045*     (2023.01)
    *G06N 3/08*     (2023.01)
    *G06T 9/00*     (2006.01)
    *G06T 11/00*     (2006.01)

(52) U.S. Cl.
    CPC ............... *G06N 3/08* (2013.01); *G06T 9/002* (2013.01); *G06T 11/001* (2013.01)

(56) References Cited

U.S. PATENT DOCUMENTS

| | | |
|---|---|---|
| 2021/0365727 A1 | 11/2021 | Aggarwal et al. |
| 2022/0036127 A1 | 2/2022 | Lin et al. |
| 2022/0058340 A1 | 2/2022 | Aggarwal et al. |
| 2022/0156992 A1 | 5/2022 | Harikumar et al. |
| 2022/0253478 A1 | 8/2022 | Jain et al. |
| 2022/0399017 A1 | 12/2022 | Xu et al. |
| 2023/0022550 A1* | 1/2023 | Guo ........................ G06T 11/60 |
| 2023/0154188 A1* | 5/2023 | Li ........................... G06V 20/47 382/159 |
| 2024/0153194 A1* | 5/2024 | Liu .......................... G06F 40/30 |
| 2024/0161462 A1* | 5/2024 | Gandelsman ............. G06T 5/60 |
| 2024/0169488 A1* | 5/2024 | Liu ........................... G06T 5/70 |
| 2024/0185588 A1* | 6/2024 | Kumari ................. G06V 10/778 |
| 2024/0220722 A1* | 7/2024 | Khattak ................. G06F 40/126 |
| 2024/0221235 A1* | 7/2024 | Gafni ........................ G06T 9/00 |
| 2024/0281924 A1* | 8/2024 | Park ...................... G06T 3/4053 |
| 2024/0282016 A1* | 8/2024 | Liu ...................... G06V 40/161 |
| 2024/0282025 A1* | 8/2024 | Park ...................... G06F 40/151 |
| 2024/0331345 A1* | 10/2024 | Li ........................ G06V 30/418 |

OTHER PUBLICATIONS

P. Aggarwal, et al., "Controlled and Conditional Text to Image Generation with Diffusion Prior", arXiv:2302.11710v1, at https://arxiv.org/pdf/2302.11710.pdf, Feb. 23, 2023 (Year: 2023).*

Jie Shi, et al., "DiVAE: Photorealistic Images Synthesis with Denoising Diffusion Decoder", at https://arxiv.org/pdf/2206.00386.pdf, Jun. 1, 2022 (Year: 2022).*

Chitwan Saharia, et al., "Photorealistic text-to-image diffusion models with deep language understanding", at https://arxiv.org/pdf/2205.11487.pdf, May 23, 2022 (Year: 2022).*

Robin Rombach, et al. "High-resolution image synthesis with latent diffusion models", arXiv:2112.10752, at https://arxiv.org/pdf/2112.10752.pdf, Apr. 13, 2021 (Year: 2021).*

* cited by examiner

SYSTEMS AND METHODS FOR HIERARCHICAL TEXT-CONDITIONAL IMAGE GENERATION

CROSS-REFERENCE TO RELATED APPLICATIONS

This is a continuation of application Ser. No. 18/193,427, filed Mar. 30, 2023, which is incorporated herein by reference in its entirety.

A non-patent literature document, Hierarchical Text-Conditional Image Generation with CLIP Latents by Ramesh et al. (arXiv:2204.06125v1), is also incorporated herein by reference in its entirety.

FIELD OF DISCLOSURE

The disclosed embodiments generally relate to systems, devices, methods, and computer-readable media for generating an image corresponding to a text input. Disclosed embodiments may relate to machine learning models configured to generate an image corresponding to a text description.

BACKGROUND

Traditional or conventional image generation systems may learn associations or classifications between digital images and text and use such associations or classifications to produce images based on a text input. Deep learning methods may involve training a machine learning model using images. Based on the training, when given a text input, a model may generate an image which it understands to be a faithful representation of the text, but often poor results are produced.

The inventors here have recognized several technical problems with such conventional systems, as explained below. Conventional systems may generate low-quality, low-resolution images, which may be visually unappealing or unhelpful. Conventional systems may be inefficient or slow in training or image generation. Conventional systems often produce incoherent, incomprehensible images that a human may not find meaningful. When given a text description or input, some traditional systems may produce images that are inaccurate, or which do not depict the information conveyed in the text. For example, conventional systems may create an association or mapping between an image and an incorrect description of the image. Conventional systems may be incapable of representing semantic meaning or portraying an understanding of the text input. Conventional systems may generate images which do not portray features, aspects, styles, or details a user desires. Some traditional systems are not capable of generating realistic images, or generating images in a certain style or aesthetic. Conventional systems may only be capable of generating one image per text input. For example, conventional systems may be incapable of generating variation or diversity in an image. Conventional image generation systems may be unable to modify the generated image. Some conventional systems may be incapable of modifying, manipulate, or vary non-essential details in the generated image, while preserving important details, meaning, and structure in the image. Conventional systems may not allow a user to visualize intermediate steps or images in the overall image generation process. Conventional systems may not allow modularity, such as the ability to interchange various neural networks in the model, which may enable greater image diversity such that a greater range of images may be produced. Conventional systems may not provide the capability of guidance for the model, such that the model is able to receive additional textual information as an input to modify the generated image. For example, given a generated image, traditional systems may not be capable of allowing a user to input additional text to guide the model to modify the image to more closely depict features the user desires.

SUMMARY

Embodiments of the present disclosure present technological improvements as solutions to one or more of the above-mentioned technical problems recognized by the inventors in conventional systems. For example, in an embodiment, a non-transitory computer-readable medium may include instructions that are executable by one or more processors to perform operations for generating an image from a text description. The operations may include accessing a text description and inputting the text description into a text encoder. The operations may include receiving, from the text encoder, a text embedding. The operations may include inputting at least one of the text description or the text embedding into a first sub-model configured to generate, based on at least one of the text description or the text embedding, a corresponding image embedding. The operations may include inputting at least one of the text description or the corresponding image embedding, generated by the first sub-model, into a second sub-model configured to generate, based on at least one of the text description or the corresponding image embedding, an output image. The operations may include making the output image, generated by the first second sub-model, accessible to a device, wherein the device is at least one of: configured to train an image generation model using the output image; or associated with an image generation request.

According to some disclosed embodiments, the at least one processor may be further configured to execute the instructions to perform operations comprising collecting a collecting a first data set and a second data set from a database, wherein the first data set comprises a set of images, wherein the second data set comprises a set of text descriptions corresponding to the set of images, jointly training an image encoder on the first data set and the text encoder on the second data set, receiving from the text encoder, a text embedding, and receiving, from the image encoder, an image embedding.

The operations may include encoding the output image with the image encoder, applying a decoder to the image, and obtaining a joint latent representation of the image.

The operations may include accessing the text embedding corresponding to the output image, based on a second text description, accessing a second text embedding, and generating a vector representation of the text embedding corresponding to the output image and the second text embedding. The operations may include performing an interpolation between the image embedding of the output image and the vector representation of the text embedding corresponding to the output image and the second text embedding, and based on the interpolation, generating a modified instance of the output image.

The operations may include prior to generating the corresponding image embedding, training a diffusion model including a transformer.

The operations may include the first sub-model being configured to encode, prior to generating the corresponding image embedding, at least one of the text description or the text embedding, via a transformer, as a sequence of tokens predicted autoregressively.

The operations may include up-sampling prior to generating the output image.

The operations may include inputting the text description and the text embedding into the first sub-model.

The operations may include inputting the text description and the corresponding image embedding into the second sub-model.

Other systems, methods, and computer-readable media are also discussed within.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1A:
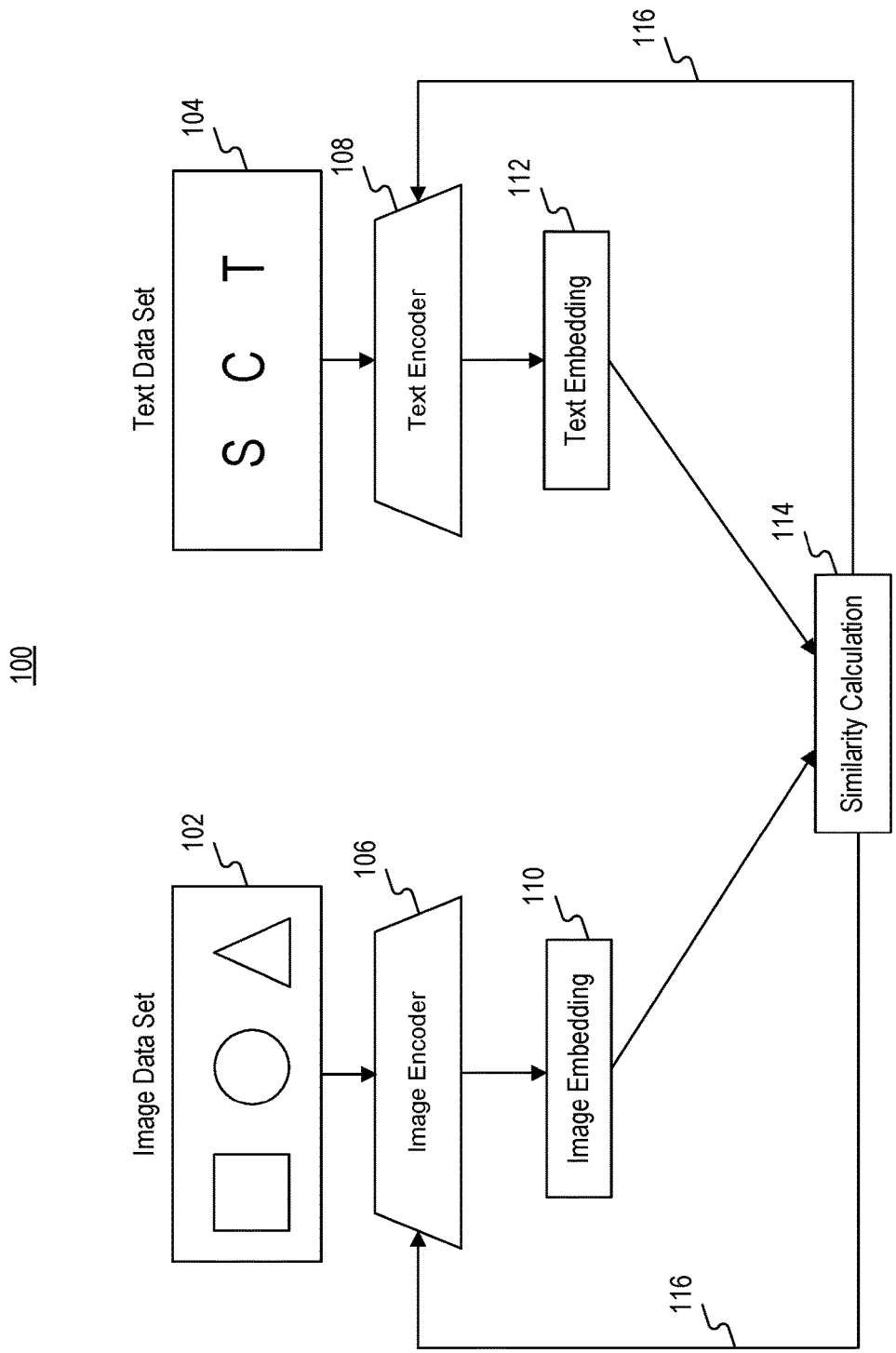
FIG. 1A is a functional block diagram for training a model for generating an image corresponding to a text input according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed by at least one processor) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Disclosed embodiments may involve improvements to the fields of deep learning, computer vision, and natural language processing, including improvements in teaching a machine to generate a digital image from a text description and in using trained models to generate digital images based on limited input. Given a text caption, disclosed embodiments may include models that generate an original, high-resolution, photorealistic image. Disclosed embodiments may provide the ability to generate variations of an image, including the ability to preserve underlying features and style of an image while changing non-essential details. For example, disclosed embodiments may be able to combine unrelated, distinct objects in a comprehensible image. Disclosed embodiments may provide improvements in generating images from a caption input, including achieving images that are more accurate and similar to the given caption, generating more diverse images, generating different tones of the same image, and achieving higher efficiency in training. Disclosed embodiments may provide the capability for a user to guide the model, such as allowing the user to give input to the model and thereby exert more control over the generated images, resulting in an image that more closely resembles the image desired by the user. As a non-limiting example, disclosed embodiments may provide practical applications, including generating images for artistic purposes, enabling humans to create artistic images that they may not be able to draw or depict themselves, and creating more images which may be used as part of training data sets for machine learning models.

Illustrative embodiments of the present disclosure are described below. In some embodiments, a system may include at least one memory storing instructions and at least one processor configured to execute the instructions to perform operations for generating an image corresponding to a text input. Generating an image may include at least one of producing, creating, making, computing, calculating, deriving, or outputting digital information (e.g., pixel information, such as one or more pixel values), which may form an image. As referenced herein, an image may include one or more of digital images, pictures, art, or digital artwork. As referenced herein, text or text inputs may comprise written language, natural language, printed language, description, captions, prompts, sequence of characters, sentences, or words. In some embodiments, a text description may comprise a text input (e.g., received from an input/output device 318). An image corresponding to a text input may include images related to a text. For example, a corresponding image may be based on, matching, associated with, analogous to, correlated to, similar to, conditional, derived from, or dependent on a certain text.

Disclosed embodiments may involve collecting a first data set and a second data set from a database. As an example, collecting a data set from a database may involve accessing or obtaining information from electronic repositories, including the internet. In some embodiments, the first data set comprises a set of images. A set of images may include one or more images, and each image in the data set may have similar or different features to one another. As such, features in different images may belong to different classifications, or images may be associated with different classes. In some embodiments, the second data set may include a set of text descriptions (e.g., words, labels, sentences, phrases, or combinations thereof) corresponding to the set of images. Text descriptions corresponding to the set of images may include captions, subtitles, or details that may explain features of an image or represent the image in a written form. For example, a text description may comprise a caption which describes prominent aspects, themes, and/or characteristics in the image. In some embodiments, sets of text descriptions which correspond to a set of images may be sets of images with associated captions. For example, image-caption pairings may be stored in a database, or stored as part of datasets commonly used in the field, such as the IMAGENET dataset or other public datasets available on the internet.

Disclosed embodiments may involve jointly training an image encoder on (e.g., using, based on) the first data set and the text encoder on (e.g., using, based on) the second data set. Training (e.g., an image encoder or a text encoder) may include one or more of adjusting parameters (e.g., parameters of the image encoder or text encoder), removing parameters, adding parameters, generating functions, generating connections (e.g., neural network connecting), or any other machine training operation (e.g., as discussed regarding system 400). In some embodiments, training may involve performing iterative and/or recursive operations to improve model performance. Jointly training may include simultaneously training, or training together, one or more neural network models. For example, jointly training may refer to models trained in parallel. In some embodiments, jointly training encoders may involve the output of one encoder affecting the other encoders. For example, outputs of each encoder may be used to update each of the encoders, such as updating weights or layers in a neural network. In some embodiments, the image encoder and the text encoder may be trained sequentially or in another non-joint manner. Disclosed embodiments may involve receiving, from the text encoder, a text embedding, and receiving, from the image encoder, an image embedding. An embedding, including a text embedding or image embedding, may include an output of an encoder, such as a numeric, vector, or spatial representation of the input to the text encoder. For example, a text embedding may comprise a mapping of the text input to a multidimensional vector representation. An encoding may also refer to an embedding. In some embodiments, receiving may include acquiring, obtaining, or accessing an input, such as a device, processor, or computer which may obtain an input.

In some embodiments, as an encoder trains and is updated, the embeddings received from the encoders may also be updated. For example, as one or more encoders are trained in parallel, the embeddings corresponding to each encoder may be iteratively updated. In some embodiments, updating the encoders may be based on an evaluation or comparison of embeddings. Embeddings may be compared to evaluate how well each embedding represents the input to the encoder. Evaluations or comparison may include implementations of optimization including but not limited to, one or more of loss functions, least squares, gradient descent, dot products, and cosine similarity. A neural network model may iteratively update the encoders and embeddings to obtain representations wherein the embeddings more accurately represent their inputs or wherein the embeddings more accurately represent corresponding features between inputs.

For example, image-caption pairs may be inputted into a jointly trained neural network. Images may be inputted into an image encoder, and the captions or text descriptions may be inputted into the text encoder. The image encoder may output an image embedding, and the text encoder may output a text embedding. The image embedding and the text embedding may be compared to one another to determine a similarity evaluation. For example, each component in one embedding representation may be evaluated against the corresponding component in another embedding representation. Components of embeddings may include individual elements or entries in a vector or other mathematical representation. In some embodiments, a component may be a multidimensional representation itself. For example, individual vectors, matrices, tensors, or arrays may each comprise components in an embedding. As a further example, encoders may map the text and image inputs to individual vectors, and each position or element in one vector may be compared to the corresponding position or element in another vector. In some embodiments, the comparison may be evaluated by the cosine similarity between the vectors or corresponding components of the vectors. In some embodiments, a high similarity (e.g., at or above a similarity threshold, such as close to 1) between vectors may indicate a match between components of the vectors. For example, a component of an image embedding and a component of a text embedding having a high similarity may indicate that these components are a match, such that a correct match is found between the image and its corresponding text caption from the input data set. As a further example, a first component in an image embedding may correspond to a certain image, and a first component in a text embedding may correspond to a caption, and the cosine similarity calculated between the two components may be high, such as a cosine similarity approximately equal to 1. A low similarity (e.g., below a similarity threshold, such as close to 0) may indicate that the embeddings of a certain image and caption have been incorrectly matched. In some embodiments, the dot product may be calculated between the text embedding and the image embeddings, and higher text-image dot products may correspond to captions which better describe the image. In some embodiments, the cosine similarity may be used to update the encoders. For example, the cosine similarity may be calculated between image embeddings, and the encoders may be iteratively updated to increase the cosine similarity between correctly matched image-text pairings and decrease the cosine similarity between incorrectly matched image-text pairings. In some embodiments, such a machine learning model may be considered a contrastive model, which compares or contrasts the text and image representations of objects to understand connections or meaning in the objects (e.g., represented by one or more functions). For example, contrastive models may understand connections as a distance between two points in a representation space. A contrastive model may provide a greater understanding of semantic information rather than traditional convolutional models which may predict or classify features. It is appreciated that jointly training encoders improves natural-language-based machine learning model training speed and efficiency by parallel implementation. In some embodiments, after the joint training is completed, the text and image embeddings may be fixed and used as part of other machine learning models. It is appreciated that the joint training of encoders improves image generation machine learning model training and memory use by learning associations rather than classifications that may require tedious manual examination and labelling.

FIG. 1A illustrates an exemplary functional block diagram for training a model for generating an image corresponding to a text input, consistent with embodiments of the present disclosure. As discussed herein, disclosed embodiments may involve collecting a first data set and a second data set from a database. For example, the first data set and the second data set may be instances of training data 402a. In some embodiments, training data 402a may be contained within data sources 402, which may include the internet. A first data set may comprise an image data set 102, and a second data set may comprise a text data set 104. Text data set 104 may correspond to the image data set 102. For example, text data set 104 may comprise captions corresponding to images in image data set 102. In some embodiments, image data set 102 may be an input to image encoder 106, and text data set 104 may be an input to text encoder 108. Based on the respective inputs, image encoder 106 and text encoder 108 may be jointly trained. For example, image encoder 106 and text encoder 108 may encode image data set 102 and text data set 104 in parallel, such as simultaneously. In some embodiments, image encoder 106 may generate an image embedding 110, and text encoder 108 may generate a text embedding 112. For example, the embeddings may comprise digital and/or mathematical representations of the inputs to the encoders, such as vectors, matrices, values, functions, data linkages, or combinations thereof. In some embodiments, training the encoders and embeddings may involve calculating or generating a similarity calculation 114. Similarity calculation 114 may involve a comparison or evaluation between image embedding 110 and text embedding 112. In some embodiments, similarity calculation 114 may comprise a cosine similarity. For example, the cosine similarity may be calculated between pairwise elements or components within image embedding 110 and text embedding 112. Jointly training may involve an updating 116 of the image encoder 106 and the text encoder 108, and thereby an updating of the image embedding 110 and text embedding 112. The encoders may be iteratively updated to increase the cosine similarity between correctly matched image-text pairings and decrease the cosine similarity between incorrectly matched image-text pairings. For example, a corresponding text description in text data set 104 that is correctly matched to its corresponding image in image data set 102 may have a high cosine similarity between their respective embeddings of image embedding 110 and text embedding 112. In some embodiments, updating 116 of the encoders may involve training neural networks such as manipulating weights, manipulating layers, and altering attention in a transformer. Upon completion of training, disclosed embodiments may involve receiving the image embedding 110 and the text embedding 112, which may then be accessible, for example, to a device or other machine learning models.

Disclosed embodiments may involve accessing a text description and inputting the text description into a text encoder. Accessing a text description may include at least one of retrieving, requesting, receiving, acquiring, or obtaining a text description. For example, a processor may be configured to access a text description that has been inputted into a machine (e.g., by a user) or access a text description corresponding to a request to generate an image based on the description. Inputting the text description into a text encoder may involve feeding, inserting, entering, submitting, or transferring the text description into a text encoder. A text encoder may convert text into an alternative representation (e.g., digital representation and/or mathematical representation) that preserves patterns, relationships, structure, or context between components of the text. In some embodiments, a text encoder may be a neural network configured to translate or map text into a numeric, vector, tensor, or spatial format. For example, encoders may include deep learning models such as neural networks, autoencoders, convolutional neural networks, recurrent neural networks, generative adversarial networks, or transformers. In some embodiments, encoders may segment or separate inputs. For example, an image may be split into smaller images and/or filtered versions of the same image, or a sentence may be split into individual words (or other segments of characters, such as phrases or letters).

Disclosed embodiments may involve receiving, from the text encoder, a text embedding (e.g., generated by the text encoder). As described herein, the text encoder may be a neural network, such as a transformer, which may be configured to generate the text embedding. In some embodiments, the text embedding may comprise a mapping of the text input to a vector representation (e.g., a multidimensional vector representation).

Disclosed embodiments may involve inputting at least one of the text description or the text embedding into a first sub-model. It is recognized that machine learning models and training processes may include multiple models, or stages, as part of an overall model, pipeline, or workflow. A sub-model may comprise an individual model, stage, phase, or step included or contained within a model. In some embodiments, the input to the first sub-model may be the text description or the corresponding text embedding. The first sub-model may be configured to receive, as an input, both the text description or the corresponding text embedding. For example, either the caption of the image or the vector representation of the output of the text encoder may be an input to the first sub-model. Disclosed embodiments may involve inputting the text description and the text embedding into the first sub-model. For example, the first sub-model may be configured to receive, as inputs, both the text description and the corresponding text embedding. In some embodiments, an image generation model may involve multiple sub-models, where each sub-model may comprise a stage of the image generation model. It is appreciated that a multiple stage model improves image generation machine learning model output by enabling modularity. Modularity may allow different sub-models or stages within an overall model to be switched for another sub-model and more easily changed without requiring an overhaul of the entire model, which may more customizable training to attain a desired result. For example, a transformer sub-model may be swapped for a recurrent neural network. Furthermore, sub-models within a machine learning model may allow for the outputs of each sub-model to be used as inputs to other sub-models. For example, a sub-model which generates an image may enable the image to be an output itself, or an input to another model. In some embodiments, a first sub-model may be a first stage or first series of training within a larger model. A first sub-model may comprise multiple models within the sub-model.

Figure 1B:
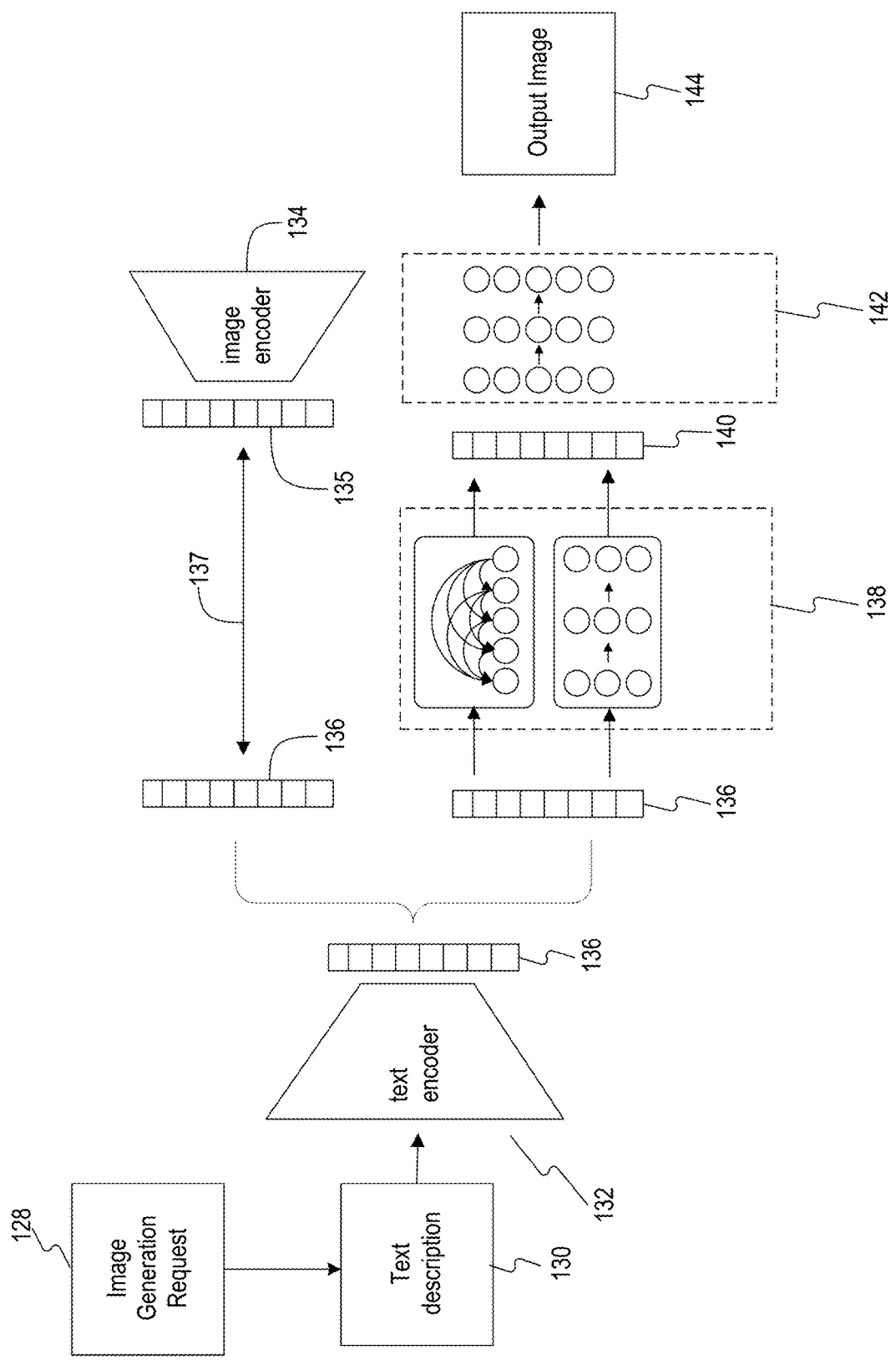
FIG. 1B illustrates a functional diagram for generating an image corresponding to a text input according to some embodiments of the present disclosure.

FIG. 1B illustrates a functional diagram for generating an image corresponding to a text input, consistent with embodiments of the present disclosure. As discussed herein, training an image generation model may involve training an image encoder 134 and a text encoder 132. Joint representation 137 may be a latent space representation of the text embedding 136 and the image embedding 135. In some embodiments, upon completion of training, text encoder 132 and image encoder 134 may be fixed and may be used as part of machine learning models. In some embodiments, an image generation request 128 comprises a request or query (e.g., an electronic transmission of information) to input/output devices 318. For example, a user may initiate image generation request 128 by interacting with input/output devices 318. Generating an image corresponding to a text description may involve accessing a text description 130 and inputting the text description 130 to the text encoder 132. Text encoder 132 may generate a text embedding 136, which may be an input to first sub-model 138.

In some embodiments, a first sub-model may be configured to generate, based on at least one of the text description or the text embedding, a corresponding image embedding. As described herein, a sub-model may be modular such that different machine learning methods may be integrated into the sub-model. As such, the first sub-model may generate corresponding image embeddings via one or more machine learning models, or combinations of different machine learning models. For example, multiple types of model classes may be used to generate the corresponding image embeddings based on the text embedding input to the first sub-model. Corresponding image embeddings may represent image embeddings generated as an output of the first sub-model. In some embodiments, the corresponding image embedding may be different from the image embedding generated during joint training of the text encoder and the image encoder. In some embodiments, the first sub-model comprises a prior model which produces image embeddings from the text embeddings and the text descriptions. In some embodiments, a prior model may be configured to translate between one or more representations of inputs. For example, a prior model may map between different embeddings, such as text embeddings or image embeddings. In some embodiments, a prior model may reduce the dimensionality of an input (e.g., by principal component analysis), which may be performed prior to performing other operations (e.g., with the reduced-dimensionality input).

Figure 2:
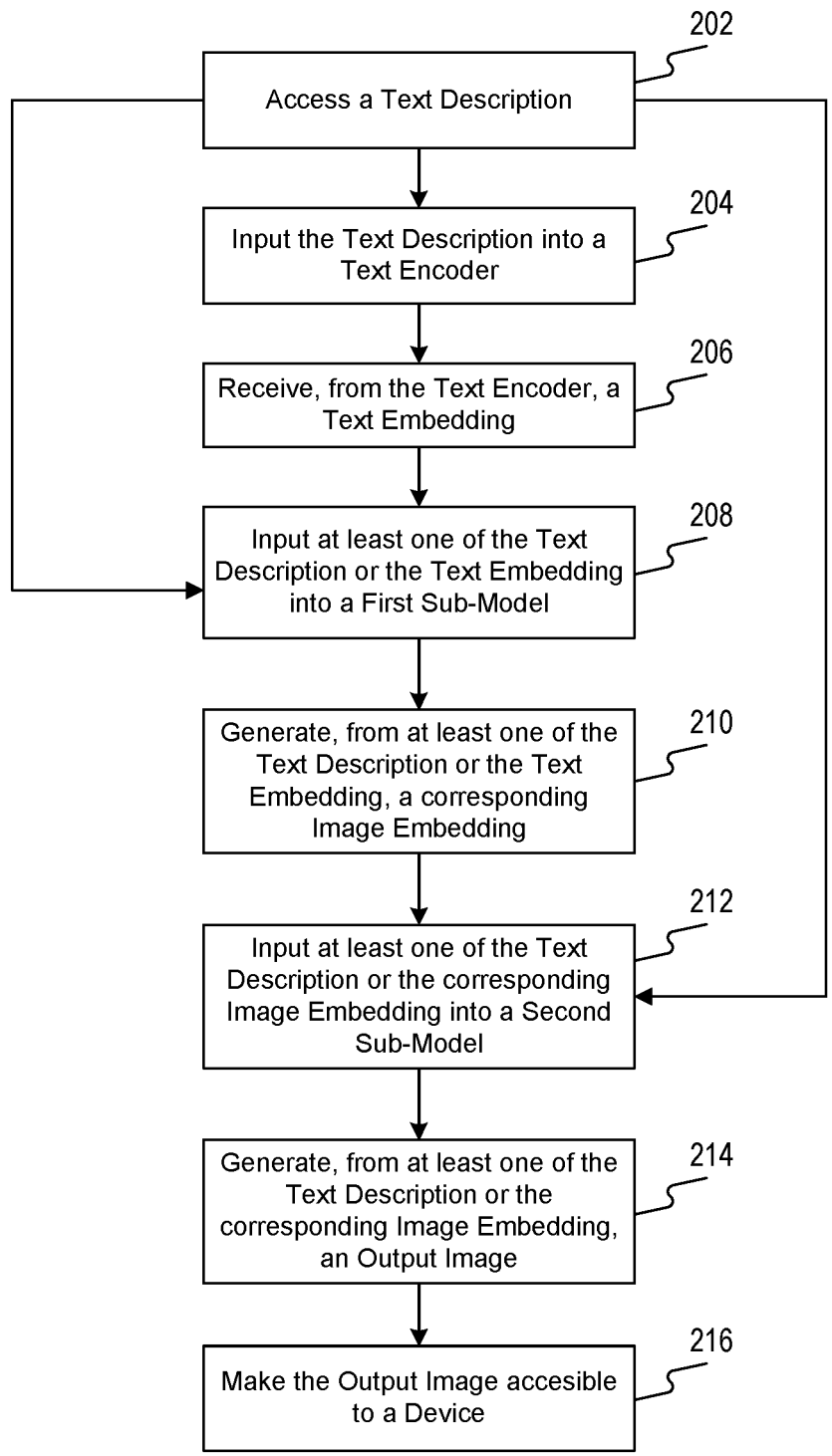
FIG. 2 is a flow diagram illustrating an exemplary method for generating an image corresponding to a text input in accordance with some embodiments of the present disclosure.

FIG. 2 illustrates a flow chart of an exemplary method for generating an image corresponding to a text input, consistent with embodiments of the present disclosure. The process shown in FIG. 2 or any of its constituent steps may be implemented using operating environment 300, system 400, or any component thereof. In some embodiments, the process shown in FIG. 2 may represent the workflow of inference for generating an image corresponding to a text input. The steps illustrated in FIG. 2 are exemplary and steps may be added, merged, divided, duplicated, repeated (e.g., as part of a machine learning process), modified, performed sequentially, performed in parallel, and/or deleted in some embodiments. FIG. 2 includes steps 202-216. At step 202, a method may involve accessing a text description. At step 204, a method may involve inputting the text description into a text encoder. At step 206, a method may involve receiving, from the text encoder, a text embedding. At step 208, a method may involve inputting at least one of the text description or the text embedding into a first sub-model.

In some embodiments, the first sub-model may include an autoregressive prior. In some embodiments, the first sub-model is configured to encode, prior to generating the corresponding image embedding, at least one of the text description or the text embedding, via a transformer, as a sequence of tokens predicted autoregressively. Autoregressive priors or autoregressive models may involve generative sequential models. Autoregressive models may involve regression models which take measurements at previous time steps to predict values at a next or future time step. Predicting autoregressively may involve a sequence of data where previous data points are used to predict future values in the sequence. For example, previously occurring outputs in a model may be used as inputs to the model, such as a model including convolutional layers. In some embodiments, encoding or configured to encode may involve converting an input (e.g., a text or image embedding) into a sequence of tokens or discrete codes, via a machine learning model. In some embodiments, training the autoregressive prior may involve inputting the image embedding into a transformer to predict a sequence of tokens. The autoregressive prior may be conditioned on the text caption and the text embedding such that they are inputted into the transformer, and then their output from the transformer is appended to the beginning of the sequence of tokens. In some embodiments, the image embedding caption and the text embedding may be converted into a sequence of discretized codes. It is appreciated that the human mind is not equipped to autoregressive modeling, given its computationally complex nature, which goes beyond simple calculations.

In some embodiments, the first sub-model may include a diffusion prior. A diffusion prior may comprise a diffusion model, which may involve a transformer-implemented generative model. A diffusion model may learn structure in data by modeling the diffusion of the data in a latent space. A latent representation space (e.g., including multiple latent representations), feature space, or embedding space, may include a mathematical space representing a mapping of what a neural network has learned from training data, such as a set of images. For example, in a latent space, data points that have similar features may be positioned closer to each other. As such, a latent space may be a compressed spatial representation. For example, a diffusion model may involve a neural network which denoises an image by reversing a diffusion process. The diffusion process may involve adding noise to an input, such as randomly sampled noise and Gaussian noise, at different steps, until the input becomes indistinguishable from noise. In some embodiments, the process of adding noise may include a Markov chain beginning with an image and resulting in an image that is an approximation of pure noise. The diffusion model may be trained to reverse the noising process and attempt to reconstruct the noisy image to its original form. For example, neural networks such as convolutional neural networks, including UNET, may predict the noise in each image step. In some embodiments, at least one process (e.g., using a decoder) may then reconstruct the noise to generate the output image. As such, the model may be trained to regenerate data (e.g., at each step) that may resemble what the original data was before each noising step. For example, in the reverse process (e.g., at each step in the reverse process), the model may generate a new image. In some embodiments, prior to generating the corresponding image embedding, the first sub-model may include training a diffusion model including a transformer. In some embodiments, the first sub-model diffusion model, which may be referred to as a diffusion prior, may involve a decoder-only transformer. A decoder-only transformer may be a transformer with a model architecture that does not include an encoder portion, such as a transformer configured to decode but not encode. Some architectures of transformer models may include encoder and decoder portions. Disclosed embodiments may involve decoder-only transformers with a causal attention mask. The causal attention mask may increase the accuracy of the decoder training. In some embodiments, the diffusion prior may be trained on or operate on an ordered sequence. For example, the diffusion prior may be trained on a sequence of tokens of the text description, text embeddings, an encoding for the diffusion timestep, the noise image inputted to the image encoder, and a final encoding. The output of the final encoding may be an output of the transformer, which may predict the image encoding during the reverse noising process. In some embodiments, the diffusion prior may be trained on the text description and the text embedding. It is appreciated that combining a prior model, such as a diffusion prior or an autoregressive prior, together with text embeddings or text descriptions forms a non-conventional and non-generic arrangement, which contributes to generating more diverse, varied images from a text input.

For example, as referenced in FIG. 1B, a first sub-model 138 may be configured to generate a corresponding image embedding 140. In some embodiments, prior to generating corresponding image embedding 140, first sub-model 138 may include a prior model, such as an autoregressive prior. The prior model may be configured to encode text description 130 or text embedding 136 via a transformer. In some embodiments, first sub-model 138 may comprise an autoregressive prior. For example, the autoregressive prior may encode text description 130 or text embedding 136 via a transformer. In some embodiments, first sub-model 138, prior to generating corresponding image embedding 140, first sub-model 138 may include a diffusion prior model, which may include a transformer. The output of first sub-model may be the corresponding image embedding 140. For example, the diffusion prior or the autoregressive prior may generate the corresponding image embedding 140, as discussed herein. In some embodiments, corresponding image embedding 140 may be different from image embedding 135 resultant from training of image encoder 134. Corresponding image embedding 140 may be accessible to other models or to be used for image generation.

Disclosed embodiments may involve inputting at least one of the text description or the corresponding image embedding, generated by the first sub-model, into a second sub-model. In some embodiments, a second sub-model may include an individual model, stage, phase, or step, which may follow a first sub-model (e.g., the sub-models may be digitally, electronically, and/or computationally linked). A second sub-model may be the final stage of a machine learning model, or a second sub-model may be followed by one or more subsequent sub-models. In some embodiments, the input to the second sub-model may be the text description or the corresponding image embedding. The second sub-model may be configured to receive, as an input, the text description or the corresponding image embedding. For example, either the caption of the image or the vector representation of the output of the prior model may be an input to the second sub-model. Disclosed embodiments may involve inputting the text description and the corresponding image embedding into the second sub-model. In some embodiments, the second sub-model may be configured to receive, as an input, both the text description and the corresponding image embedding.

In some embodiments, the second sub-model may be configured to generate, based on at least one of the text description or the corresponding image embedding, an output image. Generating (e.g., by a sub-model) an output image may include performing one or more computations, image data operations (e.g., generating digital color information, pixel information, image line information, image processing operations, and/or image object information), or other digital executions. An output image may include a digital image conditioned, trained, or based on one or more of the inputs to the model. In some embodiments, a second sub-model may be an image generation model which generates the output image, such as one or more of a generative adversarial network, convolutional neural network, variational autoencoder, or decoder, as nonlimiting examples. For example, the second sub-model may be a decoder. In some embodiments, the second sub-model may comprise generating a diffusion model. In some embodiments, the corresponding image embeddings may be projected into the space of the diffusion model. For example, projecting may involve mapping the image embeddings to a mathematical space compatible embeddings of the time steps of the diffusion models. As a further example, the image embeddings may be inputted to a machine learning model such as transformer, may be mapped to tokens, which may be concatenated to a sequence of outputs from the text encoder. The decoder sub-model may involve diffusion models and/or modified diffusion models to generate the output image. It is recognized that traditional diffusion models may begin with randomly sampled noise, such as Gaussian noise, and thus may not be capable of being guided or tailored to generate specific images or images with certain features. Thus, to generate images or features within images which may more closely represent a text input, a diffusion model may be augmented or supplemented to assist in guiding the model and training the model. In some embodiments, the second sub-model may generate a diffusion model associated with (e.g., including) at least one of the text description, the text embedding, or the corresponding image embedding. For example, the text description and the text embedding may be inputs to the diffusion model and may augment the training of the diffusion model.

As referenced in FIG. 2, at step 210, a method may involve generating, from at least one of the text description or the text embedding, a corresponding image embedding. At step 212, a method may involve inputting at least one of the text description or the corresponding image embedding into a second sub-model. At step 214, a method may involve generating, from at least one of the text description or the corresponding image embedding, an output image. At step 216, a method may involve making the output image accessible to a device.

In some embodiments, training the modified diffusion model may involve encoding an input sequence of text into tokens. A diffusion model may include one or more transformers, as described herein. Tokens may include discretized portions of input data, such as a sequence of text. For example, tokens may include words, characters, or parts of words from the text sequence. At a time step (such as each time step in the diffusion reversal process), each token may be assigned a meaning or semantic representation. Tokens may be an input to a transformer, which may generate output tokens or token embeddings. Output token embeddings may also be added (e.g., an input to) to an attention mechanism in the transformer architecture. For example, an attention mechanism, including a self-attention layer, may learn the relevance or context of output token embeddings. One or more of the output token embeddings, such as the final output token embedding, may be used to condition the diffusion model. For example, the text description may be inputted into the transformer, and one or more, or all, of the output tokens may be as an input in the diffusion model. As discussed herein, the diffusion model may use (e.g., may include) neural networks, such as convolutional neural networks, in the reverse process of generating images from noise. As such, the token embeddings may be included in the reverse process to provide guidance on generating the output image, thereby enabling improved text-conditional image generation. In some embodiments, layers in neural networks, including attention layers, may be conditioned on a plurality of the tokens. In some embodiments, both the text description and the text embeddings are used to provide guidance to the diffusion model. For example, text embeddings may be projected to a timestep embedding, or projected to tokens of context that may be added to the sequence of output token embeddings. It is appreciated that combining text descriptions together with text embeddings in training and using a diffusion decoder model forms a non-conventional and non-generic arrangement, which contributes to generating output images that may have specific features or resemble the information contained in the text. Furthermore, it is appreciated that the text descriptions may help the diffusion model to learn aspects of natural language that the text or image embeddings do not convey well within conventional systems.

For example, corresponding image embedding 140 may be an input into a second sub-model 142, as referenced in FIG. 1B. In some embodiments, the text description 130 and the corresponding image embedding 140 may be inputted into second sub-model 142. Second sub-model 142 may involve a diffusion model or a modified diffusion model. In some embodiments, the modified diffusion model may include combinations of the text description, the text embedding, or the corresponding image embedding, which may be used to condition the modified diffusion model, as discussed herein. The second sub-model 142 may generate output image 144. For example, the modified diffusion model may generate output image 144.

In some embodiments, the second sub-model may comprise up-sampling prior to generating the output image. High resolution images may be desired, and as such, images may be up-sampled to increase resolution. For example, up-sampling may involve generating additional data points (e.g., pixel information) and inserting the data points into the image (e.g., interpolating). In some embodiments, up-sampling may comprise one or more models that take an input image and increase the resolution of the image. Up-sampling may include repeating the up-sampling process one or more times. In some embodiments, up-sampling may comprise inputting the lower resolution image into a diffusion upsampler and generating the higher resolution image. For example, the output image from the second sub-model, such as the diffusion decoder model, may be an image with a lower resolution, such as a 64×64 resolution. This image may be up-sampled once, resulting in a 256×256 resolution image. The 256×256 resolution image may then be up-sampled again, resulting in a 1024×1024 resolution output image. It is appreciated that higher resolution images may be desired, as they may provide increased quality, clarity, and aesthetic pleasure. It is also appreciated that the human mind is not equipped to perform up-sampling, given its computationally complex nature, which goes beyond simple calculations.

Disclosed embodiments may involve making the output image, generated by the second sub-model, accessible to a device. In some embodiments, making accessible to a device may involve communicating (e.g., transmitting, such as across a network) information to a device, storing information in a medium accessible to the device, and/or notifying the device, as described herein. For example, making accessible to a device may involve presenting the output image to the device. In some embodiments, an output image may be made accessible to a device in response to a request from the device (e.g., a request including text input). In some embodiments, text descriptions, text embeddings, image embeddings, text encoders, image encoders, and/or intermediates of the sub-models described herein, may also be accessible to a device. In some embodiments, the device may be configured to train an image generation model using the output image. In some embodiments, the device may be associated with an image generation request. In some embodiments, the device (or group of devices, as the case may be) may be configured to train an image generation model using the output image, and associated with an image generation request. A device configured to train may involve devices which may condition or train machine learning models, such as image generation models, based on the output image. For example, a device may be capable of training a neural network for image generation, and the output image may be an input to the neural network. In some embodiments, text descriptions, text embeddings, image embeddings, text encoders, and/or image encoders associated with an output image may be used as inputs or as part of other image generation models. Devices associated with an image generation request may include devices with user interfaces, devices which may be connected to a network, or other devices capable of receiving a request from a user or other device. In some embodiments, a device associated with an image generation request may be a computer which may present the output image to a user or to another machine learning model. In some embodiments, an image generation request may involve generating an output image based on a text description. For example, based on a request, at least one processor may generate an image corresponding to the text input, and the image may be made accessible to the device. In some embodiments, an image generation request may be for one or more images, and the device may be capable of making one or more images accessible, such as to a user. In some embodiments, aspects of the present disclosure may present one or more images for each image generation request or for each text input. It is appreciated that the human mind is not equipped to perform training of an image generation model such as a neural network or outputting a digital image, given its computationally complex and digitally-based nature, which goes beyond simple evaluations. It is also appreciated that the capability to train an image generation model and make an image generated from a request accessible to a device, which implements a solution rooted in computer technology rather than simply following rules, and contributes to solving the complex problem of generating one or more digital images which can be used for neural network training or responding to a digital input.

As discussed herein, an image generation model may generate variations of an image, such as by manipulating or changing certain features in the image. In some embodiments, a machine learning model may generate a latent representation of corresponding pairs of text and images. Disclosed embodiments may involve encoding the output image with the image encoder, applying a decoder to the image, and obtaining a joint latent representation of the image. In some embodiments, a joint latent representation may involve a bipartite latent representation, such as a latent space representation wherein one dimension may represent a text or image embedding, and another dimension may represent information pertaining to the reconstruction of the output image. Encoding the output image may involve inputting the output image to the image encoder. For example, the output image may be applied to the image encoder, which may result in a latent space representation of the image embedding. Applying a decoder to the image may involve inputting the output image to a decoder, such as a diffusion model decoder. For example, the output image may be an input to inverter models or diffusion models, including modified diffusion models as discussed herein or denoising diffusion implicit models. The models may be conditioned on the image embeddings, and the output of the model may be a latent representation of reconstructions of the image. In some embodiments, the bipartite latent representation may provide a representation of the noise in a time step during the diffusion process, enabling the decoder to produce a reconstruction of the image.

It is appreciated that this a joint latent space representation improves text to image generation machine learning model outputs by enabling visualization of the image embeddings. In combination with a multi-stage model, embodiments of the present disclosure may enable various image embeddings to be visualized. For example, image embeddings may be an input to a decoder model, and the decoder model may generate or reconstruct images. The images may convey information such as the semantic information encoded or mapped by different dimensions or embeddings, which may provide meaningful insights on how the encoder learns, as well as providing guidance on how the training of the encoders may be improved. For example, if during training, an incorrect relationship (e.g., match) is predicted between a caption and an image, embodiments of the present disclosure may enable the visualization of what the image encoder is learning, and consequently use this new information to improve the training of the image encoder. It is also appreciated that the joint latent representation space, which implements a solution rooted in computer technology rather than simply following rules, contributes to solving the complex problem of producing manipulations of an image based on a text input.

As discussed herein, embodiments of the present disclosure may enable manipulating or generating variations of images that are based on text descriptions. Variations of images, such as the generation of a different instance of an image, may be important as a user may want to generate an image that is slightly different from the original image. For example, the user may desire to change non-essential features of an image, such as the position of a certain object, while retaining the essential features, such as the presence of the object. Such capability may be desired for various practical applications, including artistic applications, as well as applications of creating new images, which may be used to augment image data sets to train models. Aspects of disclosed embodiments enable the generation of image variations that preserve semantic information, such as the meaningful information (such as an understanding of what is being shown) in an image, as well as preserving stylistic information or elements, while varying the non-essential details. For example, variations of images may be generated by inputting image embeddings to a decoder and repeating the process one or more times. The output images may be variations of the image, where the underlying structure and important features in the image are kept similar, but minor details are altered. For example, a user may possess an input image of a clock hung on a branch of a tree, and embodiments of the model may output variations wherein the location of the clock is changed on the tree branch, while maintaining the presence of the clock, branch, and tree in the image. Such a variation may have features that are more aligned with the features the user desired, and for example, may save the user time from having to manually draw the image. In some embodiments, variations may blend content and style between input images.

It is appreciated that embedding images and text to the same latent space contributes to enabling language-guided image manipulations. Mapping embeddings of images and text to the same latent space, together with language-guided modeling forms a non-conventional and non-generic arrangement, which contributes to the capability to manipulate an existing image based on textual information. For example, an image may be modified to reflect a new text description. Disclosed embodiments may involve accessing the text embedding corresponding to the output image. In some embodiments, the text embedding corresponding to the output image may include the text embedding received from the text encoder in the first sub-model. For example, the text embedding may be based on the input or caption which the output image is based on. In some embodiments, the text embedding may correspond to a baseline, such as a generic caption, or an empty caption. Some embodiments may involve, based on a second text description, accessing a second text embedding. A second text description may include the new text caption or description which the modified image should reflect. Accessing the second text embedding may include inputting the second description into the text encoder, and receiving the resultant text embedding. Disclosed embodiments may involve generating a vector representation of the text embedding corresponding to the output image and the second text embedding. In some embodiments, the vector representation, which may be referred to as a difference vector or text diff, may be the normalization of the difference between the second text embedding and the text embedding corresponding to the output image. Disclosed embodiments may involve performing an interpolation between the image embedding of the output image and the vector representation of the text embedding corresponding to the output image and the second text embedding. Performing an interpolation may involve rotating between the image embedding and the difference vector with spherical interpolation, such as spherical linear interpolation. Based on the interpolation, disclosed embodiments may involve generating a modified instance of the output image. Based on the interpolation may involve the interpolation producing intermediate representations, such as interpolates or trajectories of embeddings based on an angle. Generating the modified instance of the output image may inversion to reconstruct the image, or applying the interpolates to a decoder or diffusion decoder model, as discussed herein.

For example, a model may generate an output image based on a caption of "a photo of an antique car," through embodiments of the present disclosure. The model may generate the text embedding for the caption, which corresponds to the output image. It may be desired to modify the output image of the antique car, such that the modified image reflects the second text description of "a modern car". The second text description may be inputted into the text encoder, resulting in a second text embedding. The difference vector of the text embedding and the second text embedding may be generated, and the interpolation can then be performed. The generated modified instance of the output image may then be an image of a car with modern features. As such, embodiments of the present disclosure may allow visualization of changes occurring as the image is modified, such as generating visualizations of before and after modified instances of an image. It is appreciated that this capability of generating modified instances of output images improves image generation machine learning model output by enabling more user guidance and allowing a user to provide language to direct the model to generate a desired image output.

It is appreciated that combining a first stage sub-model together with a second sub-model for an image generation model forms a non-conventional and non-generic arrangement, which contributes to modeling features such as semantics and meaning in images which humans recognize as important.

Figure 3:
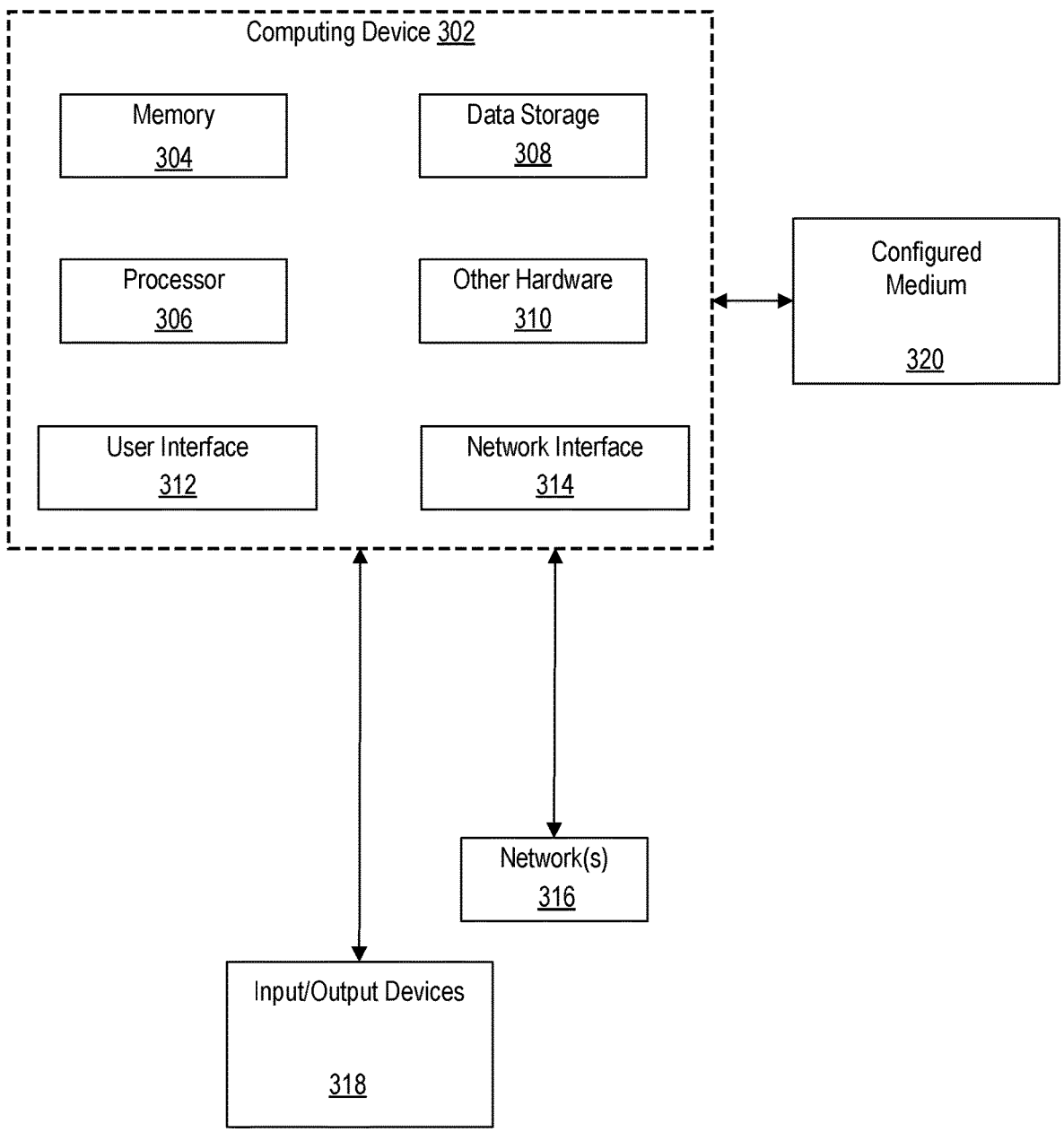
FIG. 3 is a block diagram illustrating an exemplary operating environment for implementing various aspects of this disclosure, according to some embodiments of the present disclosure.

An exemplary operating environment for implementing various aspects of this disclosure is illustrated in FIG. 3. As illustrated in FIG. 3, an exemplary operating environment 300 may include a computing device 302 (e.g., a general-purpose computing device) in the form of a computer. Components of the computing device 302 may include, but are not limited to, various hardware components, such as one or more processors 306, data storage 308, a system memory 304, other hardware 310, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 3, an operating environment 300 for an exemplary embodiment includes at least one computing device 302. The computing device 302 may be a uniprocessor or multiprocessor computing device. An operating environment 300 may include one or more computing devices (e.g., multiple computing devices 302) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 302 may be configured for end-users, e.g., with applications, for administrators, as a server, as a distributed processing node, as a special-purpose processing device, or otherwise configured to train machine learning models and/or use machine learning models. In some embodiments, multiple computing devices (e.g., a network of GPUs) may be configured to train a machine learning model.

One or more users may interact with the computer system comprising one or more computing devices 302 by using a display, keyboard, mouse, microphone, touchpad, camera, sensor (e.g., touch sensor) and other input/output devices 318, via typed text, touch, voice, movement, computer vision, gestures, and/or other forms of input/output. An input/output device 318 may be removable (e.g., a connectable mouse or keyboard) or may be an integral part of the computing device 302 (e.g., a touchscreen, a built-in microphone). A user interface 312 may support interaction between an embodiment and one or more users. A user interface 312 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 318 and computing device 302, based on input received from at user interface 312 and/or from network(s) 316. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 302 in other embodiments, depending on their detachability from the processor(s) 306. Other computerized devices and/or systems not shown in FIG. 3 may interact in technological ways with computing device 302 or with another system using one or more connections to a network 316 via a network interface 314, which may include network interface equipment, such as a physical network interface controller (NIC) or a virtual network interface (VIF).

Computing device 302 includes at least one logical processor 306. The at least one logical processor 306 may include circuitry and transistors configured to execute instructions from memory (e.g., memory 304). For example, the at least one logical processor 306 may include one or more central processing units (CPUs), arithmetic logic units (ALUs), Floating Point Units (FPUs), and/or Graphics Processing Units (GPUs). The computing device 302, like other suitable devices, also includes one or more computer-readable storage media, which may include, but are not limited to, memory 304 and data storage 308. In some embodiments, memory 304 and data storage 308 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 320 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 302, making its content accessible for interaction with and use by processor(s) 306. The removable configured medium 320 is an example of a computer-readable storage medium. Some other examples of computer-readable storage media include built-in random access memory (RAM), read-only memory (ROM), hard disks, and other memory storage devices which are not readily removable by users (e.g., memory 304).

The configured medium 320 may be configured with instructions (e.g., binary instructions) that are executable by a processor 306; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 320 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 310 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 306, memory 304, data storage 308, and screens/displays, an operating environment 100 may also include other hardware 310, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 318 such as human user input/output devices (screen, keyboard, mouse, tablet, microphone, speaker, motion sensor, etc.) will be present in operable communication with one or more processors 306 and memory.

In some embodiments, the system includes multiple computing devices 302 connected by network(s) 316. Networking interface equipment can provide access to network(s) 316, using components (which may be part of a network interface 314) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 302 may operate in a networked or cloud-computing environment using logical connections to one or more remote devices (e.g., using network(s) 316), such as a remote computer (e.g., another computing device 302). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 302 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 302 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 308 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 308 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer readable media for the generation of text and/or code embeddings. For example, in some embodiments, and as illustrated in FIG. 3, an operating environment 300 may include at least one computing device 302, the at least one computing device 302 including at least one processor 306, at least one memory 304, at least one data storage 308, and/or any other component discussed above with respect to FIG. 3.

Figure 4:
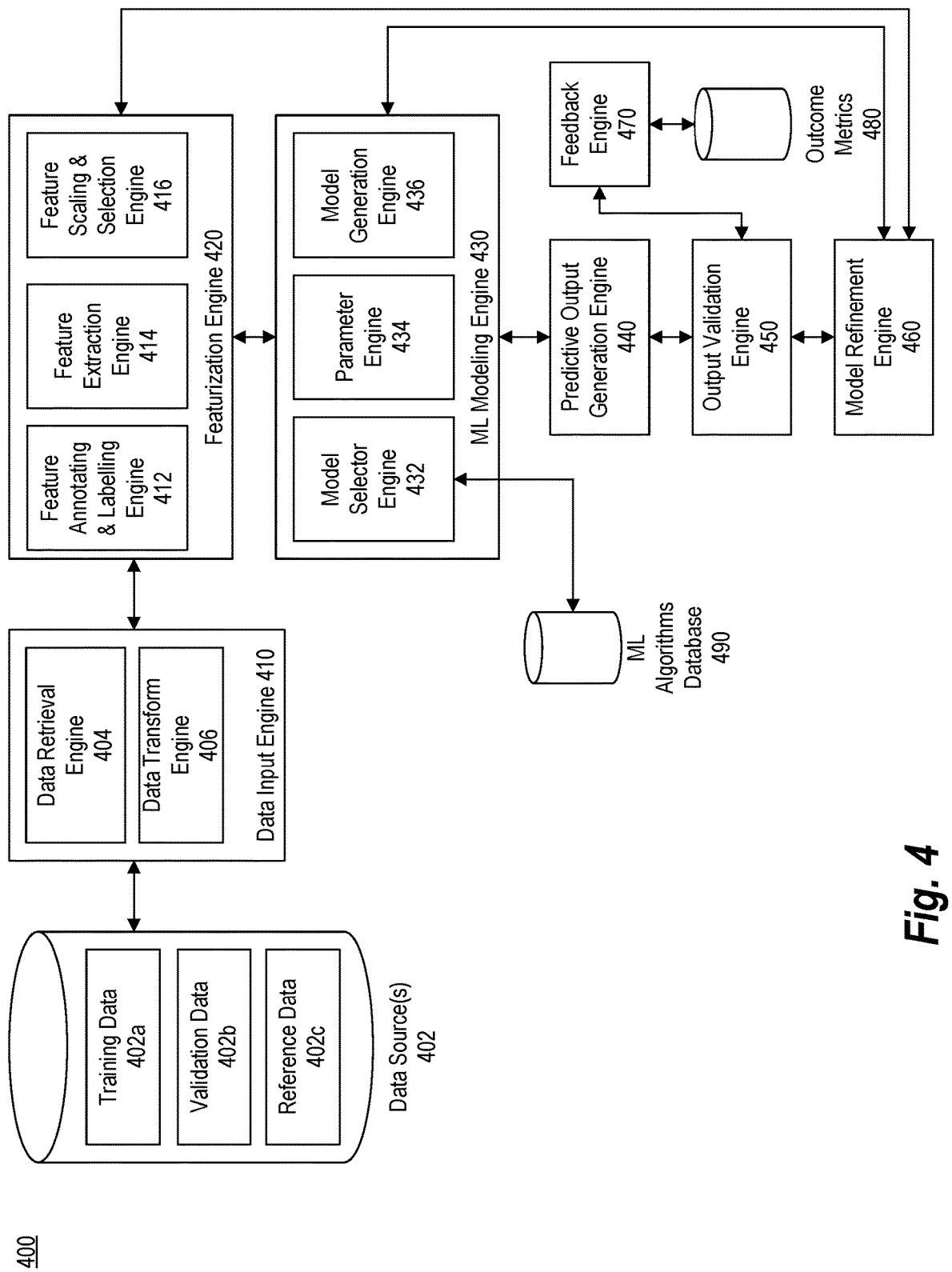
FIG. 4 is a block diagram illustrating an exemplary machine learning platform for implementing various aspects of this disclosure, according to some embodiments of the present disclosure.

FIG. 4 is a block diagram illustrating an exemplary machine learning platform for implementing various aspects of this disclosure, according to some embodiments of the present disclosure.

System 400 may include data input engine 410 that can further include data retrieval engine 404 and data transform engine 406. Data retrieval engine 404 may be configured to access, access, interpret, request, or receive data, which may be adjusted, reformatted, or changed (e.g., to be interpretable by other engine, such as data input engine 410). For example, data retrieval engine 404 may request data from a remote source using an API. Data input engine 410 may be configured to access, interpret, request, format, re-format, or receive input data from data source(s) 402. For example, data input engine 410 may be configured to use data transform engine 406 to execute a re-configuration or other change to data, such as a data dimension reduction. Data source(s) 402 may exist at one or more memories 304 and/or data storages 308. In some embodiments, data source(s) 402 may be associated with a single entity (e.g., organization) or with multiple entities. Data source(s) 402 may include one or more of training data 402a (e.g., input data to feed a machine learning model as part of one or more training processes), validation data 402b (e.g., data against which at least one processor may compare model output with, such as to determine model output quality), and/or reference data 402c. In some embodiments, data input engine 410 can be implemented using at least one computing device (e.g., computing device 302). For example, data from data sources 402 can be obtained through one or more I/O devices and/or network interfaces. Further, the data may be stored (e.g., during execution of one or more operations) in a suitable storage or system memory. Data input engine 410 may also be configured to interact with data storage 308, which may be implemented on a computing device that stores data in storage or system memory. System 400 may include featurization engine 420. Featurization engine 420 may include feature annotating & labeling engine 412 (e.g., configured to annotate or label features from a model or data, which may be extracted by feature extraction engine 414), feature extraction engine 414 (e.g., configured to extract one or more features from a model or data), and/or feature scaling and selection engine 416. Feature scaling and selection engine 416 may be configured to determine, select, limit, constrain, concatenate, or define features (e.g., AI features) for use with AI models. System 400 may also include machine learning (ML) modeling engine 430, which may be configured to execute one or more operations on a machine learning model (e.g., model training, model re-configuration, model validation, model testing), such as those described in the processes described herein. For example ML modeling engine 430 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 402a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 430 may include model selector engine 432 (e.g., configured to select a model from among a plurality of models, such as based on input data), parameter selector engine 434 (e.g., configured to add, remove, and/or change one or more parameters of a model), and/or model generation engine 436 (e.g., configured to generate one or more machine learning models, such as according to model input data, model output data, comparison data, and/or validation data). Similar to data input engine 410, featurization engine 420 can be implemented on a computing device. In some embodiments, model selector engine 432 may be configured to receive input and/or transmit output to ML algorithms database 490 (e.g., a data storage 308). Similarly, featurization engine 420 can utilize storage or system memory for storing data and can utilize one or more I/O devices or network interfaces for transmitting or receiving data. ML algorithms database 490 (or other data storage 308) may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 400 can further include predictive output generation engine 440, output validation engine 450 (e.g., configured to apply validation data to machine learning model output), feedback engine 470 (e.g., configured to apply feedback from a user and/or machine to a model), and model refinement engine 460 (e.g., configured to update or re-configure a model). In some embodiments, feedback engine 470 may receive input and/or transmit output (e.g., output from a trained, partially trained, or untrained model) to outcome metrics database 480. Outcome metrics database 480 may be configured to store output from one or more models, and may also be configured to associate output with one or more models. In some embodiments, outcome metrics database 480, or other device (e.g., model refinement engine 460 or feedback engine 470) may be configured to correlate output, detect trends in output data, and/or infer a change to input or model parameters to cause a particular model output or type of model output. In some embodiments, model refinement engine 460 may receive output from predictive output generation engine 440 or output validation engine 450. In some embodiments, model refinement engine 460 may transmit the received output to featurization engine 420 or ML modeling engine 430 in one or more iterative cycles.

Any or each engine of system 400 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 400 may be split across multiple computing devices to allow for distributed processing of the data, which may improve output speed and reduce computational load on individual devices. In some embodiments, system 400 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 400 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system comprising:
   at least one memory storing instructions;
   at least one processor configured to execute the instructions to perform operations for generating an image corresponding to a text input, the operations comprising:
   generating, by a first sub-model, an image embedding based on at least one of a text description or a text embedding, wherein the text embedding is an encoding of the text description; and
   generating, by a second sub-model, an output image based on at least one of the text description or the image embedding, wherein the second sub-model is different than the first sub-model;
   based on a second text description, accessing a second text embedding;
   generating a vector representation of the text embedding corresponding to the output image and the second text embedding;
   performing an interpolation between the image embedding of the output image and the vector representation of the text embedding corresponding to the output image and the second text embedding; and
   based on the interpolation, generating a modified instance of the output image.

2. The system of claim 1, wherein the at least one processor is further configured to execute the instructions to perform operations comprising:
   jointly training an image encoder on a first data set and a text encoder on a second data set, wherein the text encoder is configured to generate one or more text embeddings, wherein the first data set comprises a set of images and the second data set comprises a set of text descriptions corresponding to the set of images;
   receiving, from the text encoder, text embeddings associated with the second data set; and
   receiving, from the image encoder, image embeddings associated with the first data set.

3. The system of claim 1, wherein the at least one processor is further configured to execute the instructions to perform operations comprising:
   making the output image accessible to a device, wherein the device is associated with an image generation request.

4. The system of claim 1, wherein prior to generating the output image, the second sub-model further comprises: a diffusion model, the diffusion model including at least one of the text description, the text embedding, or the corresponding image embedding.

5. The system of claim 1, wherein the at least one processor is further configured to execute the instructions to perform operations comprising training an image generation model using the output image.

6. The system of claim 1, wherein the second sub-model includes at least one upsampler model configured for upsampling prior to generating the output image.

7. The system of claim 1, wherein the second text description provides a modification directive relative to the text description associated with the output image.

8. The system of claim 1, wherein the interpolation between the image embedding and the vector representation is performed in a latent embedding space.

9. The system of claim 1, wherein the interpolation comprises generating a weighted combination of the image embedding and the vector representation based on one or more weighting factors.

10. A method for generating an image corresponding to a text input, comprising:
  generating, by a first sub-model, an image embedding based on inputting at least one of a text description or a text embedding to the first sub-model, wherein the text embedding is an encoding of the text description;
  generating, by a second sub-model, an output image based on inputting at least one of the text description or the image embedding to the second sub-model, wherein the second sub-model is different than the first sub-model;
  based on a second text description, accessing a second text embedding;
  generating a vector representation of the text embedding corresponding to the output image and the second text embedding;
  performing an interpolation between the image embedding of the output image and the vector representation of the text embedding corresponding to the output image and the second text embedding; and
  based on the interpolation, generating a modified instance of the output image.

11. The method of claim 10, further comprising:
  training an image encoder on a first data set and a text encoder on a second data set, wherein the text encoder is configured to generate one or more text embeddings, wherein the first data set comprises a set of images and the second data set comprises a set of text descriptions corresponding to the set of images;
  receiving, from the text encoder, text embeddings associated with the second data set; and
  receiving, from the image encoder, image embeddings associated with the first data set.

12. The method of claim 11, further comprising:
  encoding the output image with the image encoder;
  applying a decoder to the image; and
  obtaining a joint latent representation of the image.

13. The method of claim 10, wherein prior to generating the output image, the second sub-model further comprises: a diffusion model, the diffusion model including at least one of the text description, the text embedding, or the corresponding image embedding.

14. The method of claim 10, wherein prior to generating the image embedding, the first sub-model further comprises: a diffusion model including a transformer.

15. The method of claim 10, wherein the second sub-model includes at least one upsampler model configured for upsampling prior to generating the output image.

16. A system comprising:
  at least one memory storing instructions;
  at least one processor configured to execute the instructions to perform operations, the operations comprising:
    generating, with a text encoder, a text embedding of a text description;
    generating, by a first sub-model, an image embedding based on at least one of the text description or the text embedding, and generating, by a second sub-model, an output image based on at least one of the text description or the image embedding, wherein the second sub-model is different than the first sub-model;
    based on a second text description, accessing a second text embedding;
    generating a vector representation of the text embedding corresponding to the output image and the second text embedding;
    performing an interpolation between the image embedding of the output image and the vector representation of the text embedding corresponding to the output image and the second text embedding; and
    based on the interpolation, generating a modified instance of the output image.

17. The system of claim 16, further comprising:
  training an image encoder on a first data set;
  training a text encoder on a second data set;
  receiving, from the text encoder, text embeddings associated with the second data set; and
  receiving, from the image encoder, image embeddings associated with the first data set;
  wherein:
    the first data set comprises a set of images; and
    the second data set comprises a set of text descriptions corresponding to the set of images.

18. The system of claim 16, wherein prior to generating the output image, the second sub-model further comprises: a diffusion model, the diffusion model including at least one of the text description, the text embedding, or the corresponding image embedding.

19. The system of claim 16, further comprising:
  training an image generation model using the output image.

20. The system of claim 16, wherein the first sub-model is configured to encode, prior to generating the corresponding image embedding, at least one of the text description or the text embedding, via a transformer, as a sequence of tokens predicted autoregressively.

* * * * *